United States Patent Office 2,850,354
Patented Sept. 2, 1958

2,850,354

MANUFACTURE OF THIOPHOSPHORYL CHLORIDE

George F. Korkmas and William H. Seaton, Nitro, W. Va., assignors to Monsanto Chemical Company, St. Louis, Mo., a corporation of Delaware No Drawing. Application July 22, 1953
Serial No. 369,709

6 Claims. (Cl. 23—14)

The present invention is directed to the manufacture of thiophosphoryl chloride by combination of phosphorus trichloride and sulfur. More particularly the invention is directed to improvements in effecting a combination of phosphorus trichloride and sulfur.

It is well known that sulfur and $PCl_3$ combine at a temperature in the vicinity of 170° C. It is also known that the reaction can be effected at considerably lower temperatures by carrying out the condensation in the presence of aluminum chloride catalyst. However, attempts to substitute the cheaper ferric chloride have not heretofore been successful.

In accordance with the present invention it has been discovered that ferric chloride is an active catalyst providing a sufficiently high concentration is maintained. The ferric chloride must be at least 4% by weight of the $PCl_3$ contained in the reaction mixture. For purposes of this calculation the $PCl_3$ is taken as the amount added to the reaction and contained therein at one time whether still unreacted or partially converted to thiophosphoryl chloride. As explained, subsequently it is advantageous to add the $PCl_3$ gradually to a hot mixture of sulfur and ferric chloride. This principle of the invention is illustrated by the following example:

A reactor fitted with a reflux condenser, dropping funnel and thermometer was charged with 35 grams of sulfur and 3 grams of anhydrous ferric chloride. The mixture was heated to 140° C. and 76 grams of $PCl_3$ added gradually thereto over a period of about 30 minutes. During the addition the mixture was kept at refluxing temperature. The reaction was very rapid as the vapor temperature did not fall below 120° C. The product was isolated by fractional distillation to obtain a 91% yield of excellent quality thiophosphoryl chloride, B. P. 122–124° C.

Another reaction was carried out in similar manner employing 10% ferric chloride calculated on the weight of the $PCl_3$ to be converted and again using 35 grams of sulfur. 137 grams of $PCl_3$ were added over a period of 90 minutes and the mixture heated under flux for about 20 minutes longer. The product was isolated by fractional distillation to obtain a 92% yield of thiophosphoryl chloride, B. P. 122–124° C.

The reaction takes place at lower temperatures such as inherently prevail when all the $PCl_3$ is charged in initially. In this case a somewhat higher catalyst ratio is desirable to increase the rate of conversion. After heating at refluxing temperature for 2 hours an admixture of 35 grams of sulfur, 3 grams of anhydrous ferric chloride and 46 grams of $PCl_3$, approximately 55% of the $PCl_3$ was converted to thiophosphoryl chloride. After 3½ hours heating the vapor temperature was 122° C. and a yield of 81% thiophosphoryl chloride, B. P. 122–124° C., was isolated by fractional distillation. On the other hand no reaction at all took place on refluxing for 8 hours an admixture of 35 grams of sulfur, 3 grams of ferric chloride and 137 grams of $PCl_3$.

The process is economical as the ferric chloride can be used for subsequent reactions. In fact the process can be operated advantageously in continuous manner. The catalyst can be kept in effective concentration at all times by continuously removing the volatile components at the $PCl_3$ is fed in. This has the added advantage of easily permitting a reaction temperature of 130° C. and above to be maintained at which temperature ferric chloride is an extremely effective catalyst. Unreacted $PCl_3$ can then be returned continuously to the reactor. However, the extent of conversion is usually very high and nearly pure thiophosphoryl chloride can be taken over. When operating in this manner the amount of catalyst added to the reactor is not important since in the absence of any appreciable concentration of $PCl_3$ either as such or as thiophosphoryl chloride, any significant amount of catalyst will assure concentrations well above the critical limits.

Further details of the method are illustrated by the following examples in which the volatile constituents were removed substantially as formed:

An admixture of 35 grams of sulfur and 3 grams of anhydrous ferric chloride was heated to 130–140° C. while 137 grams of phosphorus trichloride was gradually added thereto over a period of about 40 minutes. The vapors volatilized from the hot reaction mixture were condensed and collected in a separate container fitted with a fractionating column. The container was heated to volatile any unreacted phosphorus trichloride, the latter being recycled to the reactor. The same catalyst was used for another run. Another 35 grams of sulfur was charged to the reactor and another 137 grams of phosphorus trichloride added over a period of about 40 minutes. The temperature of the reaction was maintained as before at 130–140° C. The overall yield based on the total phosphorus trichloride charged was about 90% of thiophosphoryl chloride, B. P. 119–123° C. However, only about an 18% yield was obtained after heating 275 grams of phosphorus trichloride, 64 grams of sulfur and 6 grams of anhydrous ferric chloride at 140° C. in an autoclave for about an hour.

An admixture of 128 grams of sulfur and 8 grams of ferric chloride was heated to 130–140° C. 274 grams of phosphorus trichloride was added gradually to the hot mixture over a period of about 70 minutes. The reaction mixture was maintained at 130–140° C. and the volatilized vapors condensed and collected in a separate container fitted with a fractionating column. The container was heated to volatilize any unreacted phosphorus trichloride which was returned to the reactor. The yield was about 90% of thiophosphoryl chloride, B. P. 119–123° C. Lowering the amount of catalyst increased the reaction time somewhat. 274 grams of phosphorus trichloride and 70 grams of sulfur were added to an admixture of 128 grams of sulfur and 2 grams of ferric chloride at about 140° C. while removing the volatile constituents as described. About 110 minutes were required to carry out the reaction. Again the yield was about 90%, B. P. 119–123° C. based on the phosphorus trichloride.

As further illustrative of the invention an admixture of 128 grams of sulfur and 8 grams of anhydrous ferric chloride was heated to 130–140° C. The vapors from the reaction vessel were fed to the center of a fractionating column connected to a receiver. The latter was kept at about 123° C. and any unreacted $PCl_3$ returned to the reaction vessel. 137 grams of phosphorus trichloride together with 32 grams of molten sulfur were gradually added to the reaction mixture over a period of 55 minutes. The material in the receiver was then drawn off and the procedure repeated. The reaction was continued as described until a total of 685 grams of phosphorus trichloride and 150 grams of sulfur had been added. The liquid in the receiver was kept at 119–124° C. and unreacted phosphorus trichloride recycled. A yield of 773 grams of thiophosphoryl chloride, B. P. 119–124° C., was obtained which represents about 91% of the theoretical.

It is intended to cover all changes and modifications of the examples of the invention herein chosen for purposes of disclosure which do not constitute departures from the spirit and scope of the invention.

What is claimed is:

1. In the method of making thiophosphoryl chloride by reacting $PCl_3$ and sulfur the process of promoting the reaction which comprises the steps of heating a mixture of sulfur and ferric chloride above the melting point of sulfur, gradually passing into the molten sulfur mixture $PCl_3$ in amount at least ten times the weight of the ferric chloride, and converting at least 55% of the $PCl_3$ to thiophosphoryl chloride.

2. The method of making thiophosphoryl chloride which comprises heating a mixture of sulfur and ferric chloride above the melting point of sulfur and gradually adding thereto under reacting conditions $PCl_3$ in an amount at least ten times the weight of the ferric chloride, heating the reaction mixture at a minimum vapor temperature of about 120° C. and recovering thiophosphoryl chloride.

3. The method of claim 2 in which the sulfur and ferric chloride are heated to 130–140° C. and the $PCl_3$ gradually added thereto while maintaining reflux and keeping the vapor temperature at a minimum of about 120° C.

4. The method of claim 2 in which $PSCl_3$ is removed continuously from the reaction mixture.

5. The method of making thiophosphoryl chloride which comprises heating a mixture of sulfur and iron salts obtained as the residue in the reactor after recovering the thiophosphoryl chloride in the process of claim 2 above the melting point of sulfur and gradually adding thereto under reacting conditions $PCl_3$ in amount at least ten times the weight of the iron salts, heating the reaction mixture at a minimum vapor temperature of about 120° C. and recovering thiophosphoryl chloride.

6. The method of making thiophosphoryl chloride which comprises heating $PCl_3$, sulfur and 4–10% by weight ferric chloride of the $PCl_3$, and converting at least 55% of the $PCl_3$ to thiophosphoryl chloride.

References Cited in the file of this patent

UNITED STATES PATENTS

| | | |
|---|---|---|
| 1,811,602 | Woodstock et al. | June 23, 1931 |
| 2,547,158 | Godfrey | Apr. 3, 1951 |
| 2,591,782 | Cook | Apr. 8, 1952 |

OTHER REFERENCES

J. W. Mellor's "A Comprehensive Treatise on Inorganic and Theoretical Chem.," vol. 8, pages 1012, 1074, Longmans, Green and Co., New York.